Sept. 24, 1940.    P. A. WILLIAMS    2,215,948
DRILLING TOOL
Filed Jan. 23, 1939

INVENTOR.
Peter A. Williams
BY
HIS ATTORNEY.

Patented Sept. 24, 1940

2,215,948

UNITED STATES PATENT OFFICE 2,215,948

DRILLING TOOL

Peter A. Williams, Northridge, Calif., assignor to Ingersoll-Rand Company, Jersey City, N. J., a corporation of New Jersey Application January 23, 1939, Serial No. 252,364

2 Claims. (Cl. 255—64)

This invention relates to drilling tools, and more particularly to a drilling tool in which the cutting element is formed as a replaceable member and suitably secured to the body portion of the tool.

One object of the invention is to enable the cutting element to be expeditiously secured to or removed from the drilling tool.

Another object is to eliminate the chances of the cutting element becoming loose in the body portion of the tool.

Other objects will be in part obvious and in part pointed out hereinafter.

Figure 1:
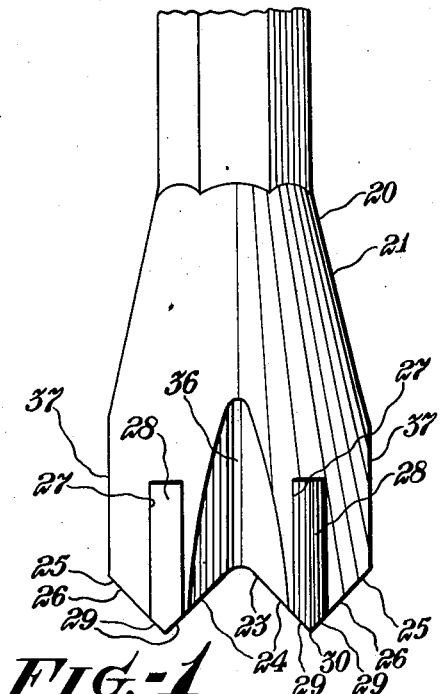
Figure 2:
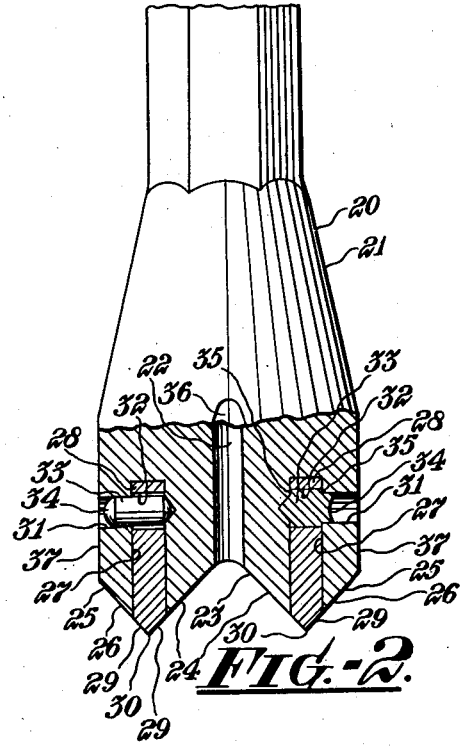
Figure 3:
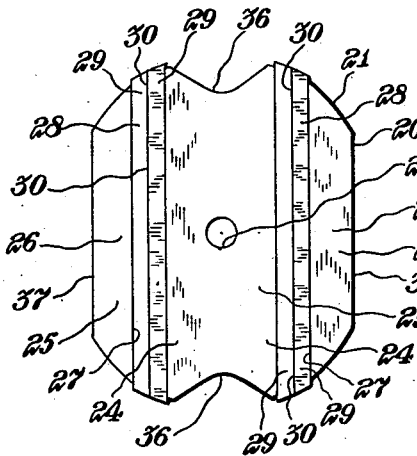
Figure 4:
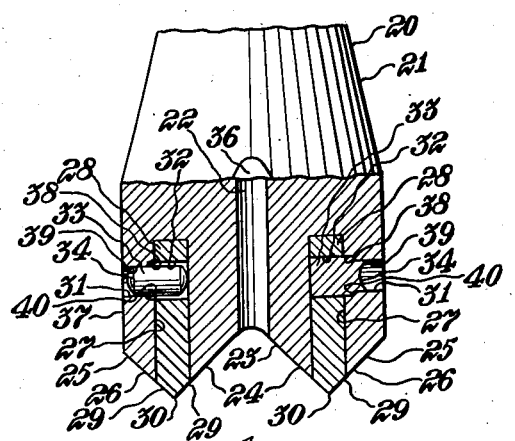

In the drawing accompanying this specification and in which similar reference numerals refer to similar parts, Figure 1 is a side elevation of the cutting end of the drilling tool constructed in accordance with the practice of the invention, Figure 2 is a similar view, partly broken away, showing the manner in which the cutting elements are secured in the body portion of the drilling tool, Figure 3 is an end view of the cutting portion of the drilling tool, and Figure 4 is a view similar to Figure 2 showing a modified form of the invention.

Referring more particularly to the drawing, 20 designates, in general, a drilling tool shown, for the sake of simplicity of illustration, as having an integral upset body 21 of generally frusto-conical shape to serve as the cutting end of the drilling tool.

The drilling tool has an axial channel 22 which opens, in the present instance, into a groove 23 in the free end of the body 21 for conveying cleansing fluid to the bottom of a drill hole for flushing the cuttings from the working surface.

The groove 23 is of V-shape and its sides 24 converge toward and cooperate with inclined surfaces 25 to define a pair of V-shaped ribs 26 that are in parallelism with respect to each other and extend across the end of the body portion 21.

In the longitudinal planes of the ribs 26 and opening from the front ends thereof are slots 27 that extend from one side of the tool to the other to receive cutting elements 28 which seat against the bottoms of the slots 27 and are preferably fitted snugly into the slots 27. The front ends of the cutting elements 28 constitute the cutting portions thereof and are accordingly provided with inclined surfaces 29 that are preferably flush with the sides 24 and the surfaces 25 and converge to define cutting edges 30.

Suitable means are provided for securing the cutting elements 28 fixedly in the slots 27. To this end the body 21 is provided with lateral apertures 31 which extend from opposite sides of the body and each aperture 31 has a portion lying on opposite sides of the slot 25 into which they open. As a preferred arrangement the portions of the apertures 31 lying between the slots and the axis of the drilling tool are concave merely, as for example of the shape and depth approximately equal to the length of the beveled point of the drill whereby the apertures 31 are formed.

The apertures 31 are preferably so located as to open into the slots 27 near the rearward ends of said slots, and in the cutting elements 28 are apertures 32 of larger diameter than the apertures 31 wherewith they will be axially aligned in the assembled positions of the parts.

The apertures 31 and 32 serve as receptacles for securing members 33 which initially are in the form of cylindrical plugs of the form illustrated in the apertures on the left hand side of Figure 2. The securing members 33 consist of malleable material and after being disposed in the apertures they are subjected to pressure, or percussive blows, on their outer ends 34 to cause portions of the plugs to be expanded into tight engagement with the walls of the apertures 31 and 32. In this way shoulders 35 are formed on the sides of the portions of the plugs lying within the apertures 32 to engage the side surfaces of the slots 27 for preventing endwise movement of the plugs 33 and at the same time portions of the plugs are fitted tightly into the portions of the apertures 31 lying on opposite sides of the slots to prevent movement of the cutting elements in the slots 27.

In order to provide a ready escape for the cuttings created by the cutting elements, longitudinally extending grooves 36 are formed in the body 21 at the ends of the groove 23 and additional clearance may be provided between the body 21 and the hole being drilled by forming flat surfaces 37 on the portions of the body lying outside of the slots 27.

In assembling the drilling tool the cutting elements are placed in the correct positions in the slots 27 so that they will seat firmly against the bottoms of the slots. The plugs 33 are then placed in position to seat in the bottoms of the apertures 31 and force is then applied to expand the plugs firmly against the walls of the apertures 31 and 32.

In the event that it may be desired to remove the cutting elements from the body this may be readily accomplished by hammer blows or other suitable force applied to the sides of the cutting elements to shear off the securing members. The inner severed ends of the plugs will then drop out or may be readily dislodged from the shallow, tapered portions of the apertures 31 and the outer ends of the plugs may be removed by driving them into the slots 27.

In the modified form of the invention illustrated in Figure 4, the aperture 31 lies entirely on one side of the slot 27, into which it opens. The aperture comprises an enlarged portion 38 adjacent the slot 27 and an outer reduced portion 39, and at the juncture of the portions 38 and 39 is a shoulder 40 against which the expanded plug 33 seats to retain said plug in the apertures.

In this arrangement the inner end of the plug 33 is driven against the side of the slot 27 in securing the plug in the apertures, and in removing the cutting elements 28 from the slot only a single line of division is required through the plug 33.

I claim:
1. A drilling tool comprising a body having a slot and an aperture opening into the slot, a cutting tool in the slot having an aperture of larger cross sectional dimensions than the body aperture, said apertures being substantially in registry, and a malleable member insertable into both apertures and adapted to be permanently deformed at the larger aperture to prevent removal through the smaller aperture.

2. A drilling tool comprising a body having a slot and an aperture opening into the slot, a cutting tool in the slot having an aperture of larger cross sectional dimensions than the body aperture, said apertures being substantially in registry, and a malleable member insertable into both apertures and adapted to be permanently deformed at the larger aperture to prevent removal through the smaller aperture, said apertures having adjacent edges adapted to shear said malleable member upon lateral movement of the cutting tool in the slot.

PETER A. WILLIAMS.